Figure 1:
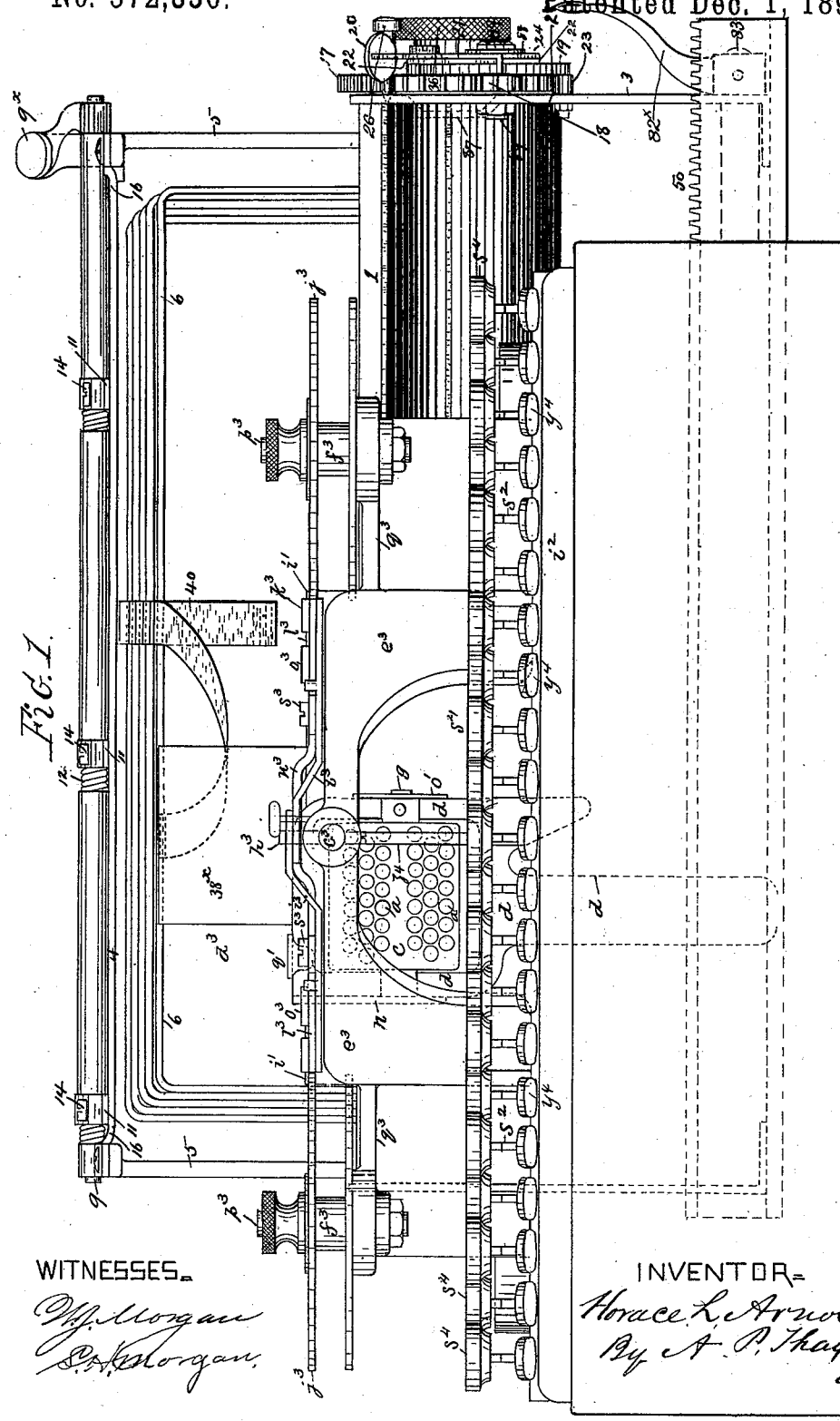

(No Model.)  11 Sheets—Sheet 3.

H. L. ARNOLD.
TYPE WRITING MACHINE.

No. 572,350. Patented Dec. 1, 1896.

WITNESSES.  INVENTOR:

(No Model.) 11 Sheets—Sheet 4.

H. L. ARNOLD.
TYPE WRITING MACHINE.

No. 572,350. Patented Dec. 1, 1896.

WITNESSES:
W. Morgan
S. H. Morgan

INVENTOR:
H. L. Arnold
By A. P. Thayer
atty

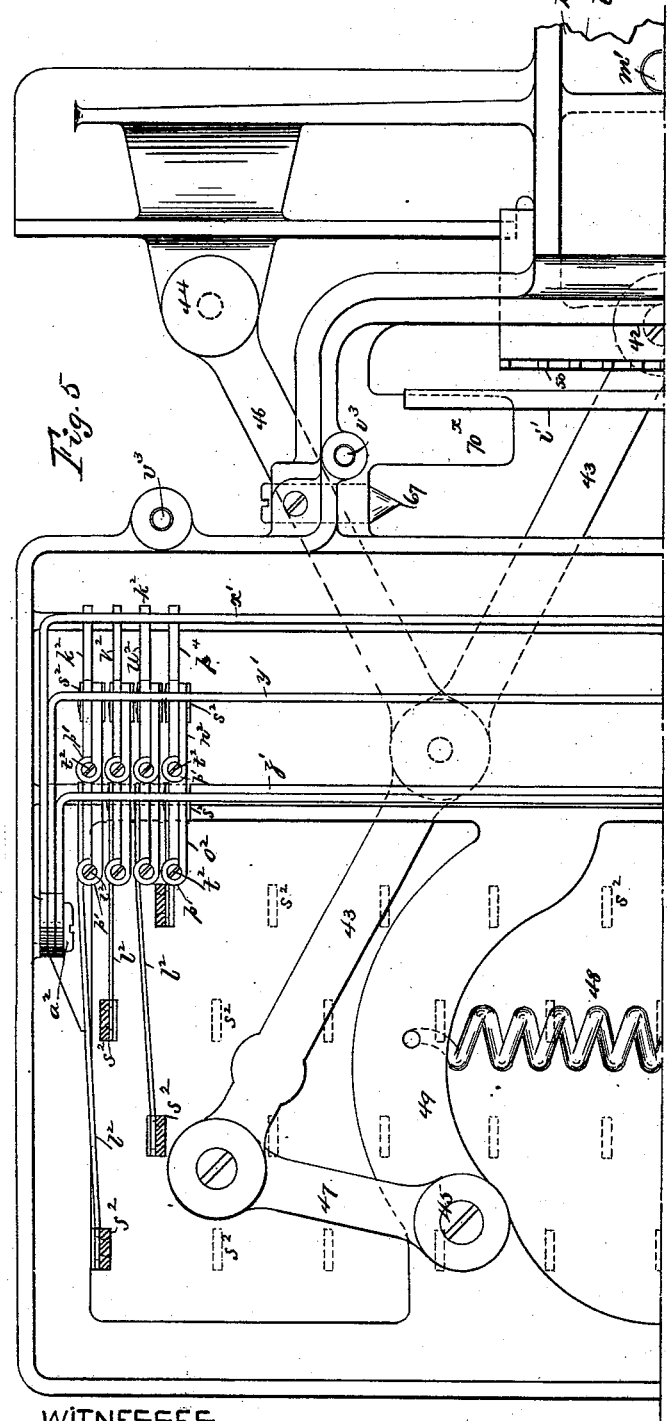

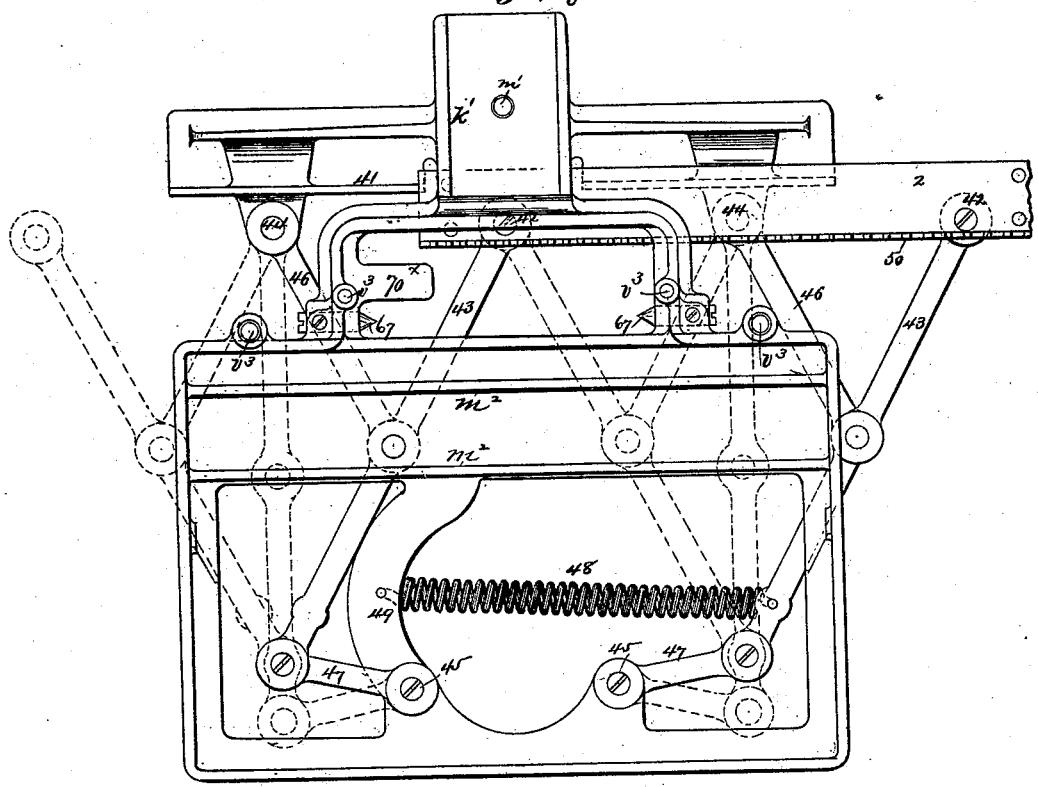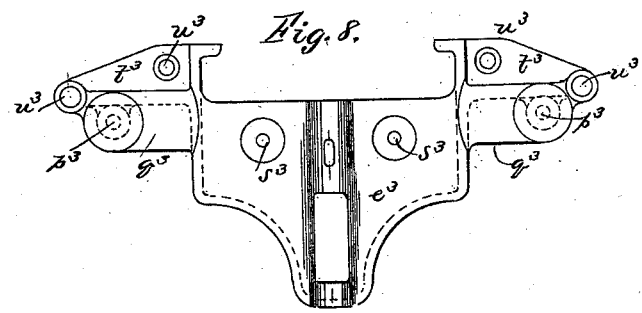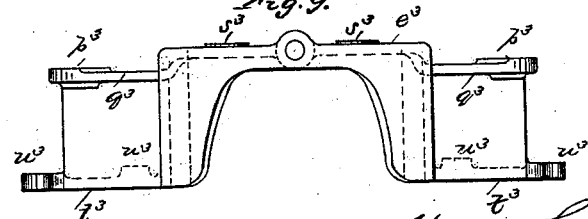

(No Model.) 11 Sheets—Sheet 7.
H. L. ARNOLD.
TYPE WRITING MACHINE.
No. 572,350. Patented Dec. 1, 1896.
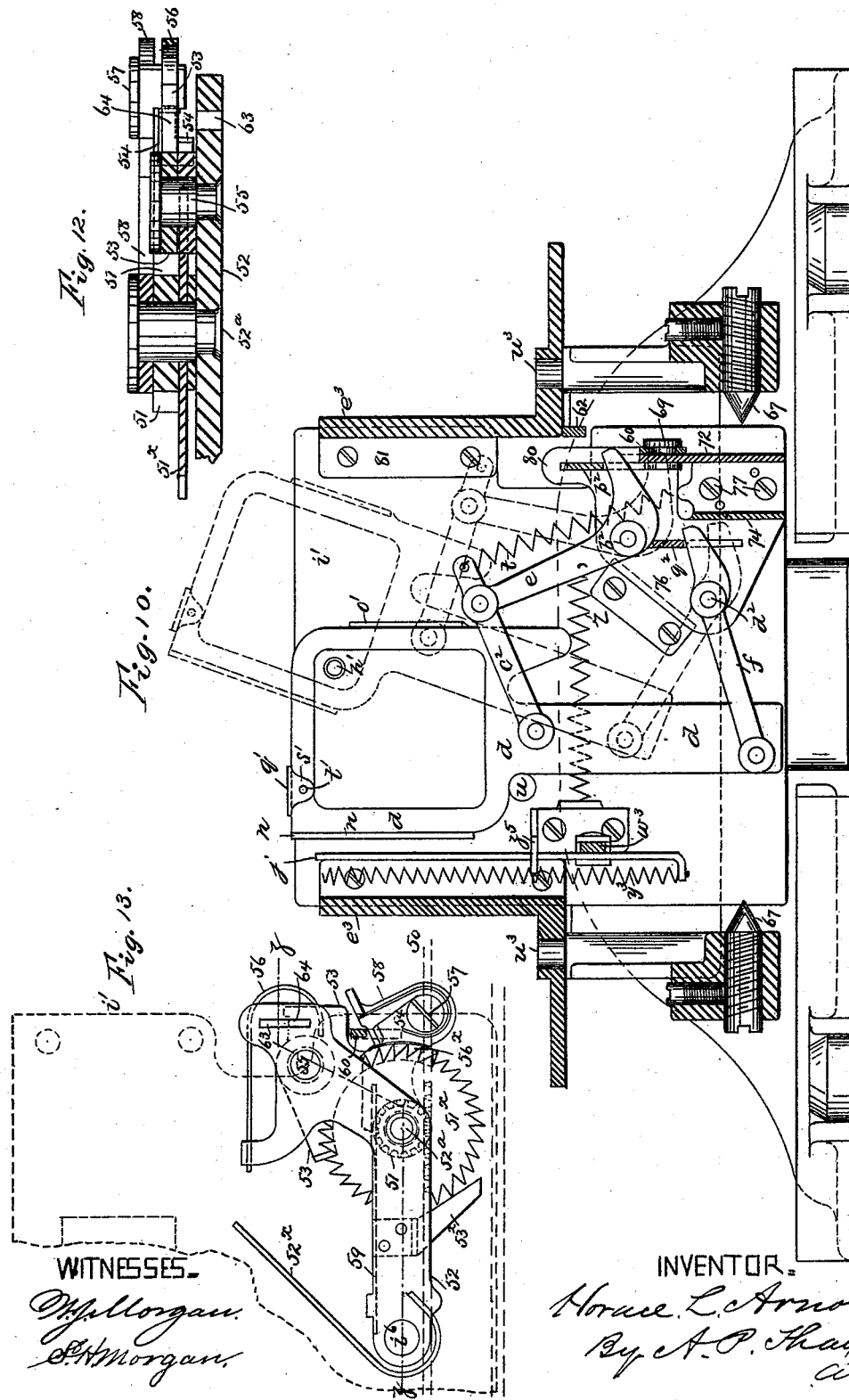
WITNESSES
INVENTOR
Horace L. Arnold
By A. P. Thayer,
atty

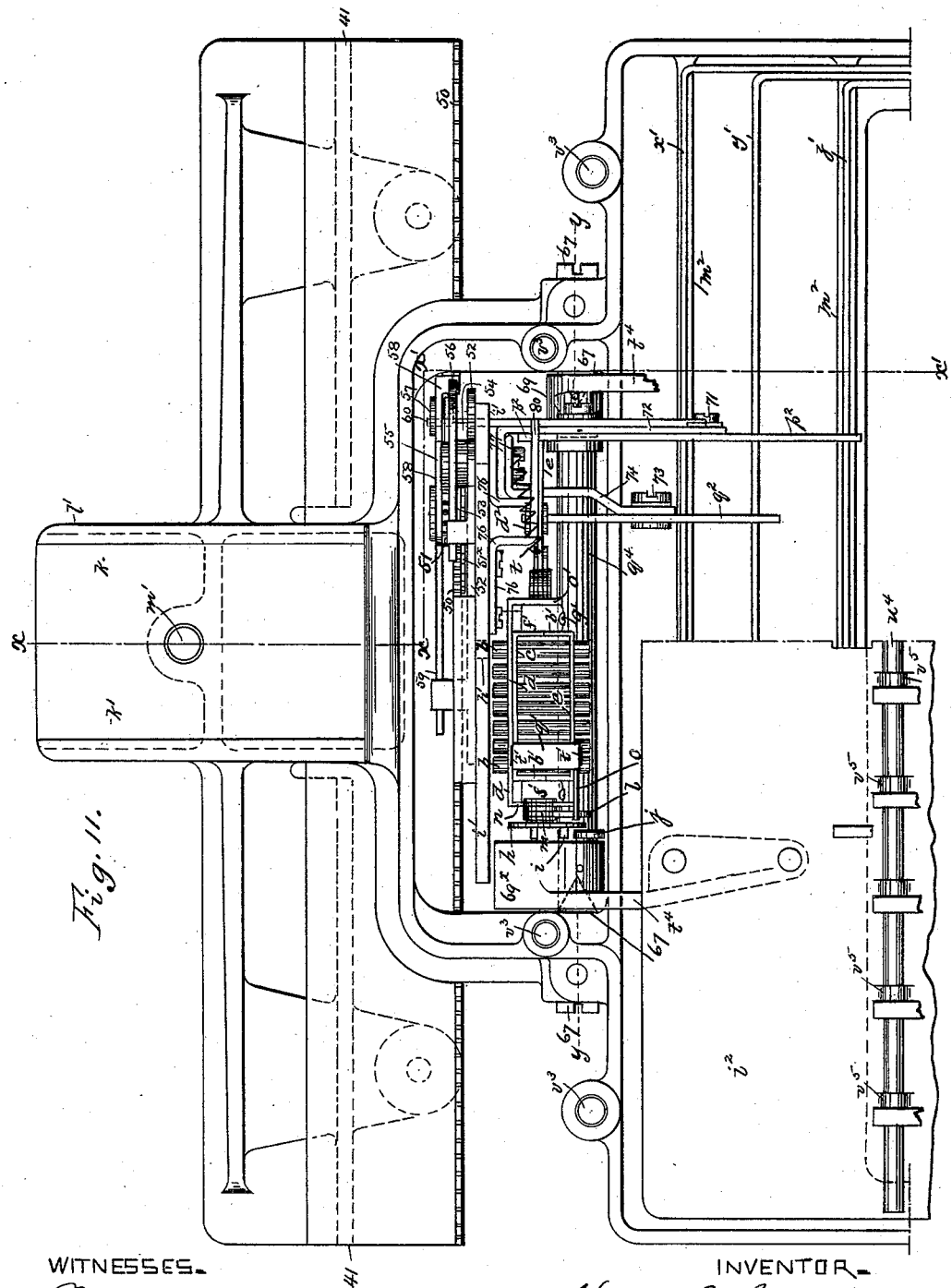

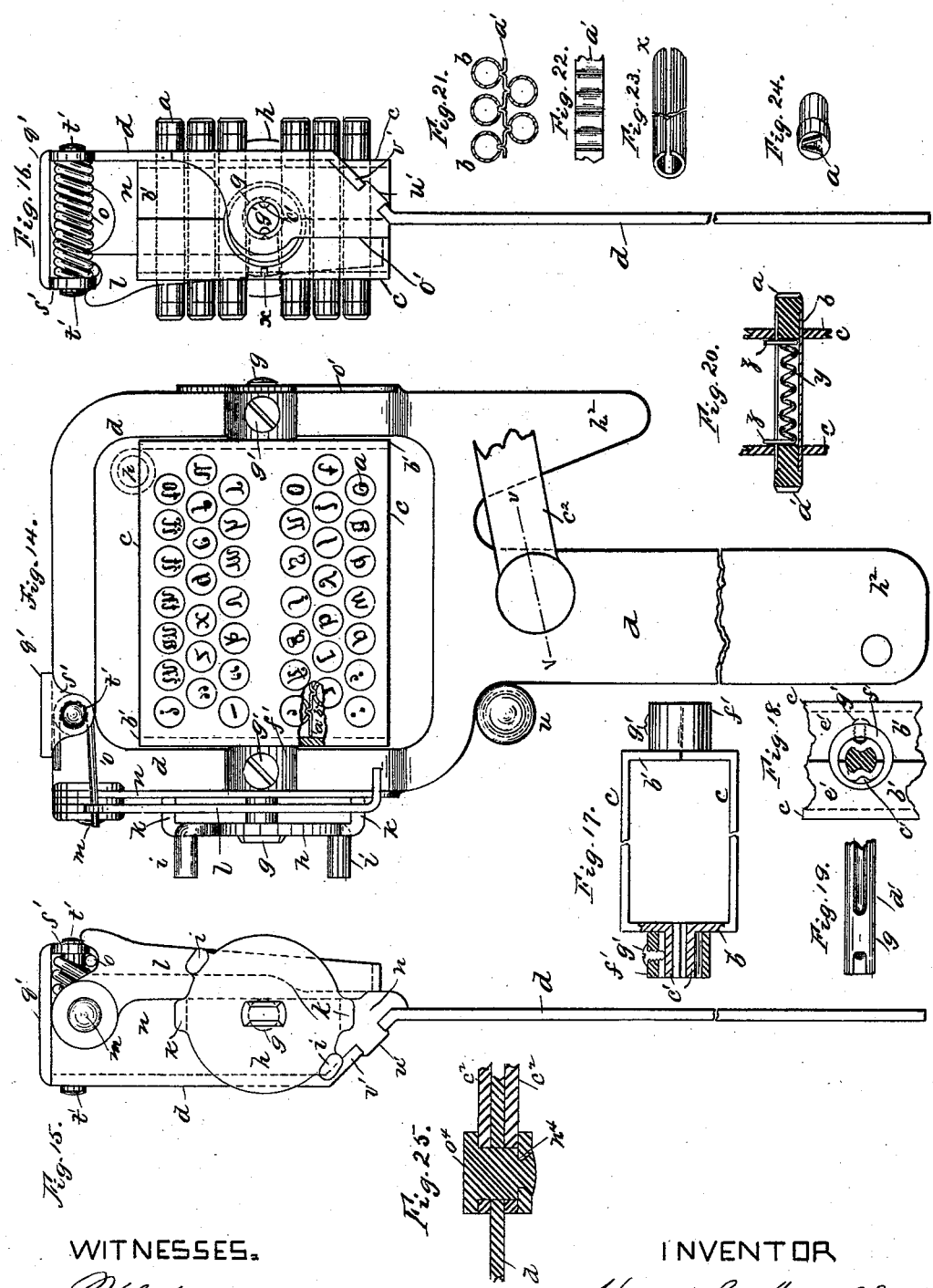

(No Model.) 11 Sheets—Sheet 10.
H. L. ARNOLD.
TYPE WRITING MACHINE.
No. 572,350. Patented Dec. 1, 1896.
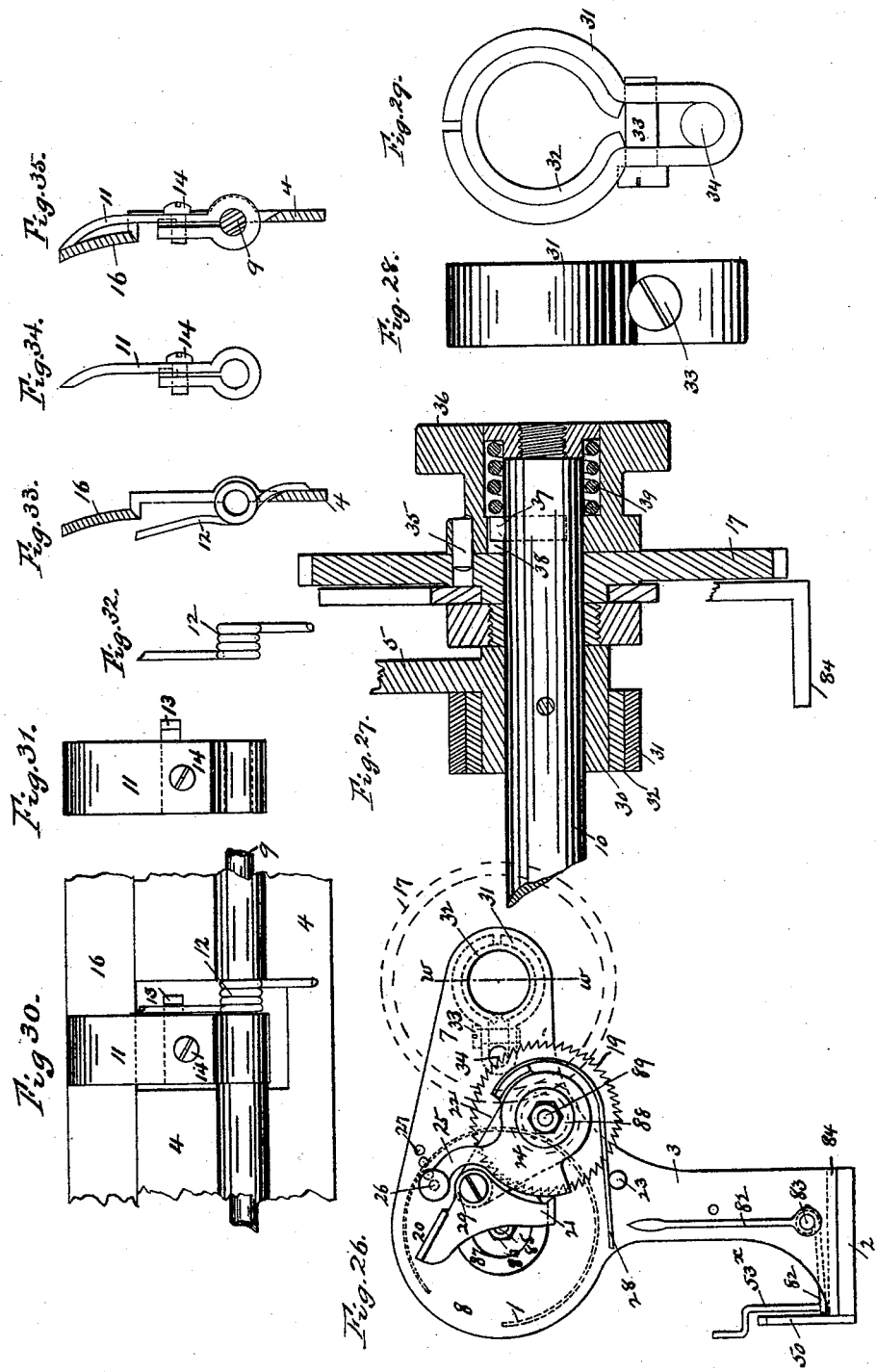
WITNESSES.
W. J. Morgan,
S. H. Morgan.
INVENTOR.
Horace L. Arnold
By A. P. Thayer,
Atty (No Model.) 11 Sheets—Sheet 11.
H. L. ARNOLD.
TYPE WRITING MACHINE.
No. 572,350. Patented Dec. 1, 1896.
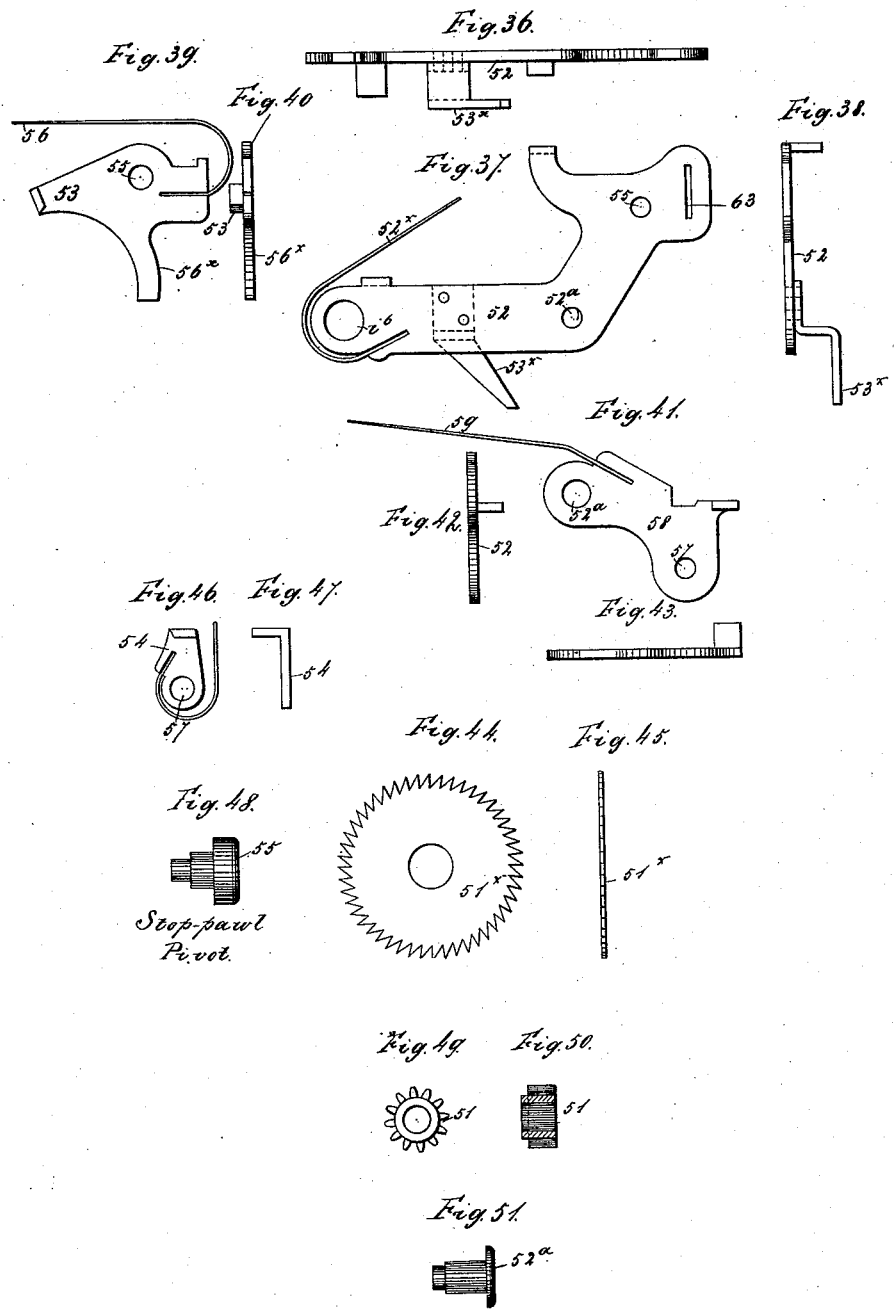
Witnesses:
Henry Hess
W. J. Morgan
Inventor:
Horace L. Arnold
By A. P. Thayer
atty

UNITED STATES PATENT OFFICE.

HORACE L. ARNOLD, OF HARTFORD, CONNECTICUT.

TYPE-WRITING MACHINE.

SPECIFICATION forming part of Letters Patent No. 572,350, dated December 1, 1896.

Application filed June 10, 1885. Serial No. 168,238. (No model.)

*To all whom it may concern:*

Be it known that I, HORACE L. ARNOLD, a citizen of the United States, residing at Hartford, in the county of Hartford and State of Connecticut, have invented new and useful Improvements in Type-Writing Machines, of which the following is a specification.

In this improved type-writer the type are formed on one end or both ends of stocks which slide in their supports to make the impressions and are actuated by a toggle-jointed plunger adapted to effect the impression by gradual pressure rather than by impact, the type being arranged horizontally in the upper end of a support, which I call a "type-mount," having both vertical and horizontal movements, and the resultant oblique movements adapted to bring any one and all the type respectively to the fixed position of the platen and plunger according as the keys for the respective letters or characters are worked, and when doubled-ended type are employed they have a support adapted for reversing them readily to print with either end, as desired. The reversing contrivance enables double the number of characters to be used within a given area of the form or face of the type-mount and diminishes the range of movements of the type-mount for bringing the different types to the printing-point in the same degree, and is preferred when it is desired to use a large number of characters. The inking of the type is effected by a ribbon moved along the printing-point, and the paper is suspended vertically and fed horizontally along between the type and the impression-block and is shifted vertically to make the spacing between the lines.

This invention consists in such elements as will divide a single downward stroke of the operator's finger into two movements, one preceding the other in point of time, so that without care on the part of the operator the type are first brought to the printing-point and are subsequently pressed upon the paper.

This invention further consists of an improved hollow type-body, an improved block or type-mount for holding the type, an improved locating and guiding device which renders it impossible for the type to reach the paper in any other than absolutely perfect alinement, improved devices for supporting, balancing, and moving the type-mount, and an improved construction of the same whereby lightness and low cost are secured, and in an improved revolving type-mount which enables me to use characters on both ends of the type, so that with forty-two type-bodies I can use eighty-four separate characters, and the needful devices to turn the type-mount half-way over at will of operator and hold it in position until it is desired to turn it again.

This invention further consists of an improved device for revolving either of the ribbon-spools at will of the operator.

This invention further consists in an improved means for supporting and guiding the paper-carriage and applying the spring to the same, and in improved devices for varying the spaces between the lines at the will of the operator, and in improved devices for moving the paper greater or less distances along the line of printing as the letter to be next printed requires more or less space on the paper, and in an improved collapsing cylinder over which the paper is drawn as the printing proceeds and by which the paper is supported in plain view of the operator and which occupies but little space when collapsed, and in certain new devices whereby the last letter printed can be brought in view and returned instantly to the printing-point, and in an improved clip for holding the paper, and in a conveniently-located "scratch-plate," which last two elements greatly aid in making corrections.

This invention further consists of an improved device of similar variable parts connected to each key, so that any key may be made to bring any letter into position without material change of parts, so that I avoid a multiplicity of dissimilar parts for the same generic purpose, and also enable an unskilled person to correct errors in type position caused by wear of the parts; and, lastly, this invention embraces a number of improved details whereby I am enabled to construct nearly all of the small parts of my improved type-writer of sheet-steel punched out and in many cases suitably bent and formed, so that I can make a machine at once lighter, stronger, smaller, and cheaper than has been before produced, all as hereinafter fully described, reference being made to the accompanying drawings, in which—

Figure 2:
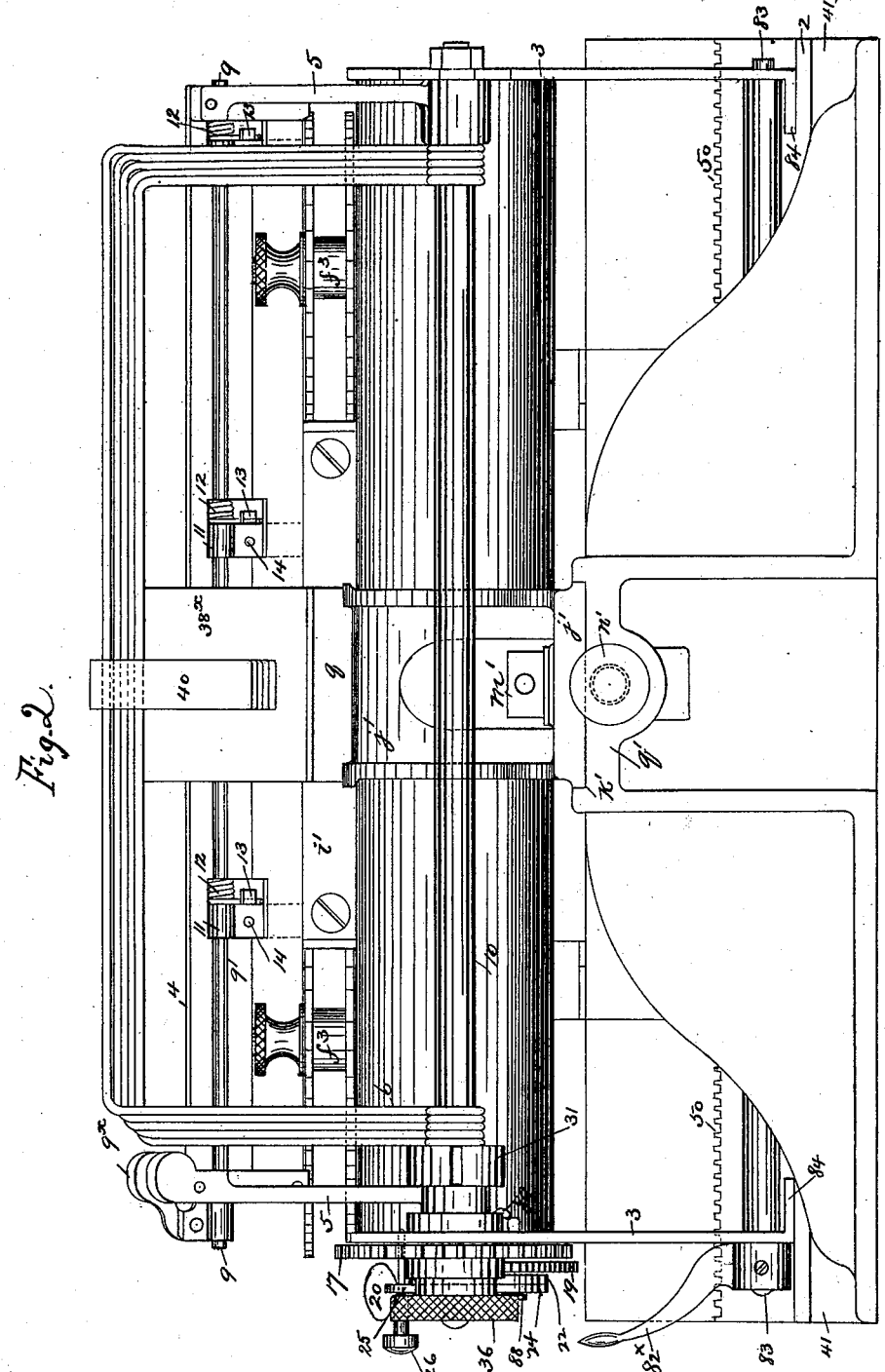
Figure 3:
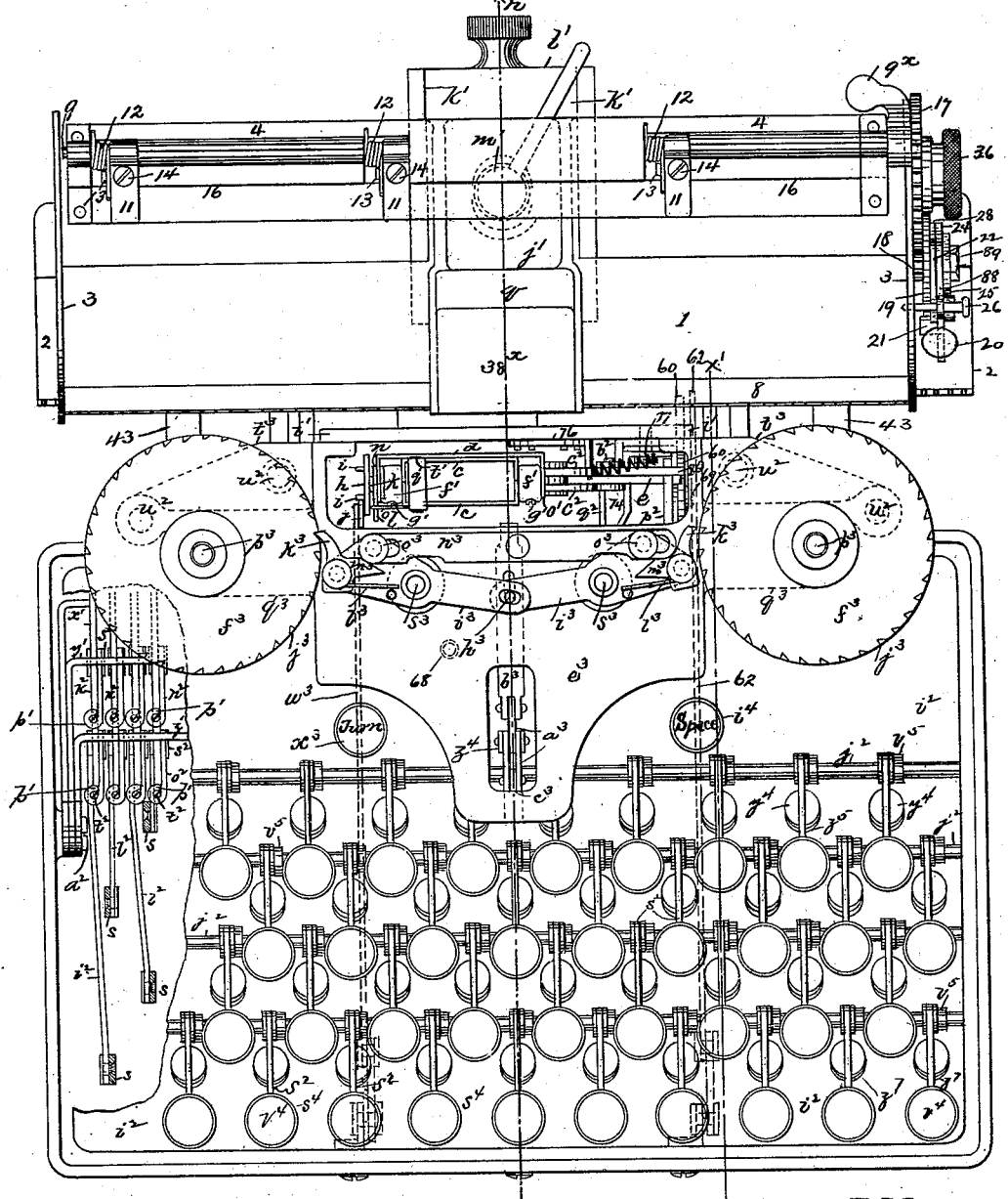
Figure 4:
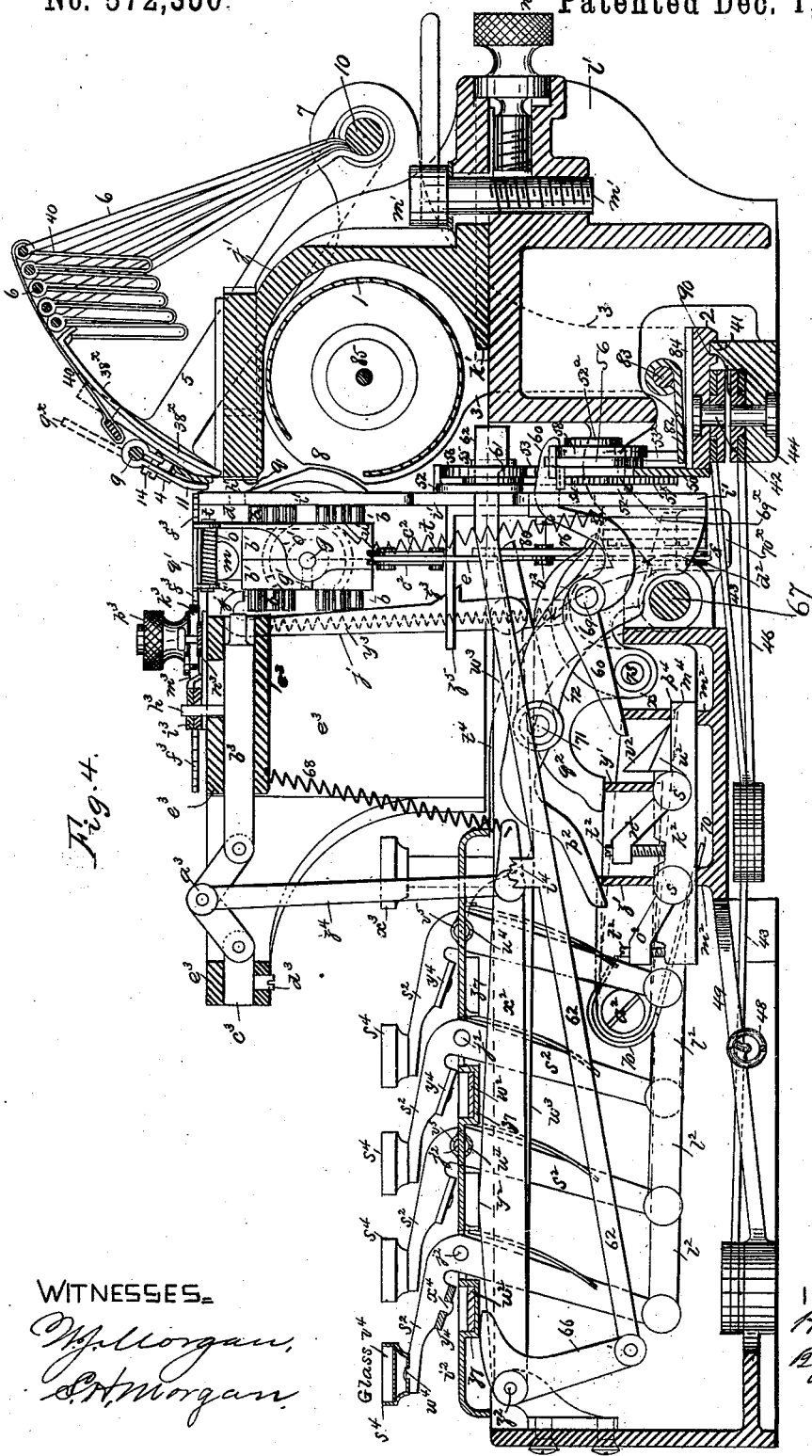

Figure 1 is a front elevation of my improved machine. Fig. 2 is a rear elevation of the same. Fig. 3 is a plan view with a part of the key-plate broken out and some parts omitted. Fig. 4 is a transverse section, partly on line $x\,x$ and partly on line $x'\,x'$. (See Figs. 3 and 11.) Fig. 5 is a plan view of one-half of the bed-frame with part of the paper-carriage mechanism and some of the gear for working the type-mount and escapement in plan and some of the key-levers in section. Fig. 6 is a central transverse section of Fig. 5. Fig. 7 is a plan of the bed-plate, part of the paper-carriage, and the jointed link mechanism I use for operating the carriage, the scale being about half size of the above-described figures, which represent the full size of the machine. Figs. 8 and 9 are respectively plan and front elevations of the table for supporting the plunger and inking apparatus, also half size. Fig. 10 represents the machine in part in sectional elevation, taken on the line $y\,y$ of Fig. 11, showing the type-mount frame and part of the lever mechanism for working the same in front elevation. Fig. 11 is a plan of the bed-plate, type-mount, and the lever mechanism of the type-mount. Fig. 12 is a section of Fig. 13 on line $z\,z$. Figs. 3 to 12, inclusive, are also on a scale of about half size. Fig. 13 is a side elevation of the carriage-escapement and space-adjusting mechanism detached. Figs. 14, 15, and 16 are front and respective side elevations of the type-mount. Fig. 17 is a top view of the type-supporting plates with a part in section. Fig. 18 is an end view of the device represented in Fig. 17, also with a part in section. Fig. 19 is a side view of part of the shaft for reversing the type. Fig. 20 is a longitudinal section of one of the type-cylinders and parts of the supporting-plates. Figs. 21 and 22 are details of the contrivance for holding the type-cylinders circumferentially. Fig. 23 is a perspective view of a split tube such as I employ in the construction of the type-cylinders. Fig. 24 is a perspective view of one of the types. Fig. 25 is a section of a joint of the type-mount levers on line $v\,v$ of Fig. 14. Fig. 26 is an end elevation of the paper-carriage. Fig. 27 is a detail of the carriage mechanism in section on line $w\,w$, Fig. 26, and on an enlarged scale. Figs. 28 and 29 are side and front views of the friction device of the line-spacing mechanism. Figs. 30 to 35, inclusive, are details of the paper-clip. Figs. 36 to 51, inclusive, are details of the escapement.

The types $a$ are formed on or attached to the ends of sliding stocks $b$, which are preferably of cylindrical form and are mounted horizontally in the thin plates $c$, located a suitable distance apart for supporting the type-cylinders near each end, the plates being perforated suitably for placing the cylinders close together for arranging the type in the order required. When the cylinders have type at one end only, these plates will be attached in any approved way to the upright plate $d$, constituting the supporting-frame, which is connected lower down to the levers $e$ and $f$ for the support of the type and for shifting them; but when the cylinders $b$ have both ends fitted with type the plates $c$ are fitted in the plate $d$ with journals $g$ for enabling the type to be reversed to print with either end, as required, and a turn-plate or disk $h$ is attached to the extremity of one of the journals, said plate having outwardly-projecting studs $i$ for being engaged by a turn-hook $j$ to reverse the type, and also having inwardly-projecting stop-studs $k$, Figs. 14 and 15, for holding the type in the working position by the keeper $l$, pivoted at $m$, near the upper end of a flange $n$ of plate $d$, and having a spring $o$, allowing it to swing and allow the studs $k$ to pass when turning the type and pressing it back against the two studs $k$, on which it bears to hold the type in the normal position. These devices constitute the type-mount, by which the type are to be respectively brought into line with the printing-point on the platen $q$ (indicated at $p$, Fig. 14) and by the guide $h'$, Fig. 10, through the medium of the type-mount levers $e$ and $f$, which effect the necessary universal movements of the type-mount in its plane according as the keys $s^2$ for the respective types are worked, the type-mount being balanced by the spring $t$ for working easily, but being influenced by a spring $r$ to the resting position against the stud $u$ when the keys are not touched, leaving the printing-point outside of the rectangle occupied by the type when at rest, and it will be seen that the characters of the double-ended type will be different on the different ends of the same type-body, both for the greater number of characters thus obtained with a given number of type and because the reversal of the type shifts their position in the field so that the impressions of the different ends are made with different keys.

For the construction of the type-cylinders it is preferred to insert the type-bodies a suitable distance in the split tubes $x$, Fig. 23, with a coiled spring $y$ in the hollow space between the ends and to secure the types with solder. The spring may have one or both ends $z$ projecting out through the slit and bearing against one or both of the plates $c$, according as the cylinders have type on one or both ends, the spring being to shift the type-cylinders back to the normal position after making the impression. The double-ended spring is employed with the double-ended type and shifts the type back to the middle position from either direction.

To prevent the type-cylinders from turning in the supporting-plates and to keep the type upright, a corrugated plate $a'$ may be fitted between two rows of the type-cylinders with its ribs engaging the slits of the cylinders, as represented in Fig. 21, and with its ends bearing against end flanges $b'$ of the type-supporting plates $c$, and the type being adjusted in the cylinders with due reference to the placing of the slits so that one plate will serve for two rows of type; but, if preferred, the type-cylinders may be thus secured by studs of one or both of the plates $c$ projecting into said slits. Owing to the varying angles at which the type-mount stands, the letters must have corresponding or regular variations from the perpendicular to bring the impressions symmetrical on the paper, as represented in Fig. 14.

In all cases of double-ended cylinders the two types are soldered in the cylinder, so that when one is right side up the other is bottom side up.

As many of the cylinders are used as will carry the desired number of type, forty-nine being the preferable number of single-ended cylinders when they are to be duplicated. Forty-eight double-ended cylinders will carry ninety-six characters of upper and lower case letters, numerals, &c., with no greater area of the form than in the lesser number of single-ended cylinders.

No order of location or arrangement need be observed in the location of the cylinder-holes in the plates of the type-mount. It is only needful that the holes should be the right size and that the type-cylinders should stand axially nearly parallel to each other and nearly at right angles to the surface at the printing-point.

In the case of the double-ended type-cylinders they are preferably grouped evenly each side of a middle space for the shaft on which the plates $c$ are mounted. The plates $c$ are preferably stamped or otherwise formed with end flanges $b'$, having central bearing-caps $e'$, adapted to embrace the shaft, and the caps are indented or ribbed inwardly at $c'$ along the bottom to form key-ribs, which fit in corresponding grooves $d'$ of the shaft for keying the plates thereto, and the caps are bound on the shaft by rings $f'$, slipped on over the ends of the caps and secured by set-screws $g'$. The shaft is slabbed off flattened on both sides at one end to receive the turn-plate $h$, in which the hole for the shaft is correspondingly flattened; but the construction of the plates and the contrivance of the turn-gear may be modified at the will of the constructor. This contrivance for the construction of the type-support enables the plates forming the frame and having the perforations for the type and the devices of said plates for connecting with the shaft to be made most simply and cheaply and of the lightest material with a single blow of a die. The contrivance of the fastening devices enables the frame to be attached and secured to the shaft very simply, and yet be made readily detachable, without rivets, bolts, or screws other than the two set-screws employed, which, being made secure against working loose, everything else is positively secured, and yet the frame can at any time be taken apart readily.

For a light, simple, cheap, and at the same time substantial contrivance of the frame of the type-mount the plate $d$ is stamped out of thin sheet-steel or other appropriate metal with side projections $n$ and $o'$, which are turned or flanged up at right angles to the plane of the frame and suitably perforated for the journal-bearings of the shaft of the type-mount, also with an extension $q'$, that is bent forward across the top of the mount and then downward at $s'$, suitably for the front bearing of the rod $t'$, which is supported at the other end in the plate $d$. The flange $n$ also supports the pivot-bearing $m$ of the keeper $l$. The flanges $n$ and $o'$ are stayed laterally and the frame-plate is materially stiffened by tongues $u'$ of the lower end riveted into notches of the plate $d$, where it is bent from the plane of the back of the type-mount to the middle plane for poising the mount.

The type are moved forward to the platen through a locating and guiding orifice $h'$ in the plate $i'$, which renders it impossible for the type to reach the paper in any other than absolutely perfect alinement, and the platen is adjustable toward and from the type for regulating the pressure of the type on the paper, said platen being supported on the bracket $j'$, which rests in the ways $k'$ on the top of the rear extension $l'$ of the bed-plate, whereon it is secured by the screw $m'$ when adjusted by the screw $n'$.

The type-mount has universal motion to a certain extent in its plane, which is in this case caused by the elbow-lever $e$, pivoted at $b^2$ and connected to plate $d$ by the links $c^2$, so as to swing said plate horizontally, and by the straight lever $f$, pivoted at $d^2$ and connected to said plate $d$, so as to swing it vertically. These I call the "type-mount" levers.

It is preferable to make the links or levers of two members, consisting of thin flat plates and connect them, respectively, to the opposite sides of plate $d$, so as to overlap a considerable margin of said plate, as at $h^2$, for substantial lateral stay to said plate, the links being connected by pivot-studs $o^4$, extending through the links and plate and having large heads and washers, and the latter being riveted on against shoulders $n^4$ of the rivets, as represented in Fig. 25. This compound or universal motion of the type-mount is to be effected for every letter or character by one motion of the key $s^2$ for said character, for which the following contrivance of apparatus is preferred, but modifications of the same may be employed: The keys consist of bell-cranks and are pivoted on the key-plate $i^2$ by the pivot-rods $j^2$, with their long arms reaching down through slots of the key-plate nearly to the bottom of the bed-plate, and each lever is connected with a wedge-slide $k^2$ by a suitable connecting-link $l^2$. These wedge-slides are arranged in a rank extending from side to side of the bed-plate under the transfer-bars $x'$, $y'$, and $z'$ and resting edgewise on the bearing-ribs $m^2$ of the bed-plate. Each key has a wedge $n^2$ to raise transfer-bar $y'$ and a wedge $o^2$ to raise the transfer-bar $z'$, and the bars are balanced by springs 70.

The transfer-bar $z'$ works the type-mount lever $e$ by the transfer-lever $p^2$ to swing the type-mount horizontally. The transfer-bar $y'$ works the type-mount lever $f$ by the transfer-lever $q^2$ to swing the type-mount vertically.

The inclinations of the wedges $n^2$ and $o^2$ of each key-slide are adapted for shifting the type-mount to bring the particular letter of the key to the printing-point, and said wedges are pivoted on the wedge-slide at $s$ and fitted with an adjusting-screw $t^2$ for facility of adjustment and for correcting them afterward in case of wear, said wedges being all made from one pattern for cheapness of construction and being adapted for any key by means of the adjusting-screw. The screws rest on the upper edges of the wedge-slides and raise or lower the wedges, according as they are turned one way or the other. Thus each key effects in a simple manner both movements or rather the resultant oblique movement of the type-mount by each single movement, and in addition thereto it is made to effect the adjustment of the space mechanism when the same is to be varied for spaces of less than "m" space, also to release the escapement of the mechanism that effects the spacing and to subsequently make the impression by the same movement.

The space which each letter is to occupy on the paper is first determined by the varying space mechanism and a subsequent action of the parts releases the escapement, so that the predetermined movement of the paper is effected by the action of the carriage-spring 48.

For varying the space mechanism all the wedge-slides for letters of medium space have a wedge $u^2$ of medium throw and those for letters of shortest space have a wedge $v^2$ of greatest throw, while the slides for the letters of "m" space have level edges $p^4$, Figs. 4 and 5, under the transfer-bar $x'$ and therefore do not lift said transfer-bar, which allows the space-adjusting devices to remain in the normal position, in which case "m" spaces are made.

The wedges $u^2$ and $v^2$ vary the space mechanism through the medium of the transfer-bar $x'$ and the transfer-lever 60, and the keys effect the release of the escapement through the medium of the key-plate $i^2$, lever 66, and the wedge-bar 62, as will be described farther on in connection with the escapement mechanism. The wedge-bar 62 may also be actuated by the space-key $i^4$ independently of the keys and key-plate when desired for spaces between words.

For a simple construction of the wedges and so that the adjusting-screws will not become slack the wedges are coiled at the upper end to form the sockets or nuts $p'$ for the adjusting-screws, and the resilience of the metal is utilized for tightly gripping the screws by making the screws sufficiently larger than the tap employed for cutting the threads to slightly spring the nut-coils when screwed in and thereby become subject to permanent binding pressure.

For guides to control the wedge-slides laterally the transfer-bar $x'$ has a notch in its lower edge for each slide where it rests on the slide, in which notch the upper edge of the slide works, as shown at $m^4$, Figs. 4 and 6. At the other ends the slides are controlled by the keys.

For effecting the impressions by the keys the keys are made to press down the key-plate $i^2$ by pressing on the pads $w^2$ after shifting the slides $k^2$, which are then not affected by the keys, because after coming to a bearing on the key-plate they cease turning on their pivots and simply move downward with the key-plate and their connecting-rods $l^2$, which rods, being pivoted to the wedge-slides in the plane of the key-plate pivots 67, allow such descent of the keys without further effect on the slides. The key-plate then presses on the lever $x^2$ at $y^2$, which lever, being pivoted to a fulcrum-bracket at $z^2$ and connected by the rod $z^4$ to the toggle-joint $a^3$ of the plunger $b^3$, pulls down the toggle-joint and forces the plunger $b^3$, which is located in the axis of the printing-point on the outer end of the type-cylinder, to make the impression. Thus the keys first shift the type, then adjust the space and govern the shifting of the paper, and finally press the type on the paper and make the impression.

The shifting of the paper is effected for spaces of maximum width and for blanks by pressing down on any part of the key-plate without touching a key, or, at the choice of the operator, by touching the space-key, as above stated. Depressing the key-plate will also work the plunger, but will not print, because no type will be brought to the impression-point.

The toggle-joint $a^3$ is jointed to the block $c^3$, adapted for adjusting the plunger by shifting along its bed and having a binding-screw $d^3$ to hold it. This adjusting-block is fitted very simply by locating it in the same bore of the ribbon-spool and plunger-stand $e^3$ that the plunger is fitted in.

The blow from a spring-actuated hammer is uniform, or nearly so, in effective force. The hand-impression is only uniform when the operator is skilful and careful.

The impression must be much more powerful when manifolding than when printing on a single sheet, and force of impact is not easily made always suitable to the work. I therefore employ an impression device which disregards the question of the matter of touch and invariably brings the type-face to a fixed point of approach to the platen. This device consists of the above-described sliding plunger operated by a toggle-joint, and the platen is adjusted by a screw so as to bring the platen nearer or farther from the type-face at will. A blow for giving the impression is also unsuitable, because it injures the ribbon and because it is noisy.

By the use of the toggle-joint I secure, through the instrumentality of the individual keys, a gradual, powerful, uniform, and noiseless impression of the type upon the paper which does not cut the ribbon, and by the use of the toggle impression mechanism, together with a platen adjustable toward and from the type and the impression mechanism, the force of the impression may be duly increased for manifolding at the same time that the adjustment is made for more sheets of paper without sensible increase of effort on the part of the operator, whereas with any other form of impression mechanism the force is only increased in the same measure as the operator makes greater exertion. Any equivalent contrivance of lever-actuating mechanism for bringing the type-face to a fixed point of approach to the platen may be substituted for the toggle-joint.

I am aware that toggle mechanism has been employed to make the impressions in stereotype-machines, but it is only in combination with the elements of type-writing machines that I use it.

The plunger is also made to feed the ink-ribbon from spool to spool $f^3$, in either direction along between the type and the platen, by connecting it with a stud $h^3$ to the slotted pawl-levers $i^3$, which respectively work said spools by ratchets $j^3$ on them and pawls $k^3$ on the levers, the arrangements being such that the back stroke of the plunger effects the shift of the ribbon when the type are withdrawn from the platen. The pawls have a spring $l^3$, tending to keep them in action upon the ratchets, and a bevel-ended arm $m^3$, by which they may be held out of action by the slide-bar $n^3$, according as said bar is shifted to the right or left along the guide-studs $o^3$, set in the pawl-levers through slots of the slide-bar, the ends of which act on the bevel-arms of the pawls.

The ribbon is to be connected at its ends to the spools, respectively, in the usual manner and be wound from one to the other alternately at the will of the operator.

The pawl mechanism is arranged on the top of the plunger-stand $e^3$, the levers being pivoted thereto at $s^3$, and the spools are arranged on the vertical pivots $p^3$ of arms $q^3$ of said stand. The stand has feet $t^3$, which are bolted through holes $u^3$ to the bed-plate at $v^3$.

The turn-hook $j$ for reversing the type is connected to a lever $w^3$ under the key-plate, from which a finger-stud $x^3$ extends up through the key-plate for pressing it down to shift the type. The hook is raised again by the spring $y^3$. The incline $z^3$ on the turn-hook throws the hook away from the studs of the turn-plate by contact with the end of the slot in the guide-bracket $z^5$, when the hook rises to avoid interference with the adjustment of the type by the keeper $l$.

The paper-carriage consists, essentially, of the tube 1, arranged parallel with the plane of the type-mount a little back of the same and below the platen and supported on the sliding base 2 by the standards 3, together with the paper-holding clips and their supporting-arms 5 for the line spacing, also the buggy-top or fan-stick arrangement of bows 6 for the support of the paper, said arms and bows being pivoted in the arms 7 of the standards 3.

The paper-tube 1 has a wide slit at 8 below the platen, through which the paper is inserted to begin with and is withdrawn as the work progresses, the top edge of the paper being fastened in the clips, which shift it successively to the printing of the lines. The paper-clips consist of the clip-bar 4, attached to the ends of the arms 5, the rod 9, supported in the clip-bar, jaws 11, attached to the rod, and the springs 12, holding the rod in its bearings in the clip-bar and pressing the jaws down on the clip-bar to grip the paper. The clip-bar has a bearing-cavity struck up in the lower side for reception of the rod, and the rod is held therein by the springs, which are coiled around the rod and have one end bearing on the upper side of the bar on one side of the rod and the other end bearing on the projection 13 of a clip-jaw on the other side of said rod, so that the stress of the springs keeps the rod up in the bearing-cavity of the bar without other keeper thereto and at the same time keeps the jaws pressed down on the bar at the edge to hold the paper. The jaws have the end connected to the rod bent into the form of a clip adapted to embrace the rod and be fastened with a binding-screw 14. The rod 9 has a lever-arm $9^\times$ for turning it to open the clips for receiving the paper. The bearing projection 13 is cut with the rest of the blank, which, together with the contrivance for securing the jaws to the rod, makes the jaws simple and cheap. The clip-bar has the curved and depressed margin 16, on which the jaws grip the paper, adapted to reach close down to the platen for the beginning and hold the paper so that the first line may be printed within three-eighths of an inch of the edge of the paper.

The arms 5 of the paper-clip are secured to the shaft 10, so as to be turned by it for feeding the paper, and the shaft is geared by the toothed wheel 17 and pinion 18 with the feeding ratchet-wheel 19, which the operator shifts for spacing the lines by pressing on the finger-piece 20 of the feed-pawl 21, which is pivoted on the pawl-arm 22, turning on the axis of the ratchet-wheel. The stop-pin 23 limits the movement of the ratchet, and the extent of the movement is varied to regulate the feed for different spaces by the cut-off 24, which determines the number of teeth that the pawl takes according as said cut-off is shifted toward or from the stop 23, said cut-off consisting of a plate pivoted on the axis of the ratchet-wheel and having a curved edge of slightly greater radius than the ratchet-wheel, with a spring-arm 25 and a stop-pin 26 for setting it in different positions along the series of pin-holes 27. The spring 28, attached to the hub of pawl-lever 22 and bearing on the stop-stud 23, returns the feed-pawl 21 to the normal position which is controlled by the hub 29 of the pawl coming in contact with the arm 25 of the cut-off, the cut-off being located so that the hub of said pawl, by which it is pivoted to the pawl-lever 22, lies in the plane of said arm, which thus serves for the stop of the pawl.

The ratchet-wheel 19 might be applied directly to the shaft 10, except that the teeth of the wheel would have to be finer than is desired practically for the shortest variation in the line-space, about a sixteenth of an inch, without making the ratchet-wheel much larger than is desirable.

It is desirable to have the arms 5 of the paper-clip of suitable radius to feed a sheet of foolscap size along the platen without turning more than half a revolution, which would require a ratchet-wheel of about the same radius as the arms if mounted on the shaft 10, as teeth of a sixteenth of an inch pitch are about as fine as practicable, whereas by gearing the ratchet-wheel to the shaft by a pinion and wheel said wheel may be much smaller and the teeth of the ratchet much larger, as is clearly shown.

The arms 5 of the paper-clip are keyed or pinned to the shaft 10, and the hub 30 of one of said arms turns in a friction-grip, preferably consisting of a spring-clip 31, friction-pad 32, and an adjusting-screw 32, held stationary by stud-pin 34 of the standards 3, but said clip may be constructed in various forms. With the arms thus provided with a friction-clip the feed-wheel 17 is detachably clutched to the shaft by the pin 35 in the hub of the sliding hand-knob 36, which is splined to the shaft by the stud 37 of the shaft and a key-groove 38 of the hub to enable the shaft to be readily disconnected from the feed-wheel and be turned by the hand-knob to swing the paper-clip back and raise up the paper along the scratch-plate $38^\times$, located over the platen for inspection of the work and for scratching out imperfections. The friction-clip holds the shaft securely in any position for such purposes while said shaft is disconnected from the wheel, and the paper can be returned again to the exact position from which it was shifted by turning the hand-knob 36 back until the stud 35 snaps into the hole in wheel 17 by the influence of a spring 39, inclosed in a cavity of the hub of the hand-wheel and set so as to bear the hand-knob against the feed-wheel.

The feed-wheel, retained in its position by the ratchet, which has frictional resistance for the purpose, forms a certain gage to arrest the paper exactly in the proper alinement. The friction for holding the ratchet is produced by the washer 88, between which and the end support 3 the ratchet-wheel, pinion, and other parts are clamped, with the required pressure, by the pivot-bolt 89 and its nut.

The arms 5 for carrying the paper-clips form the best means of reaching close down to the platen without interfering with other parts of the machine, and without occupying much space they serve as well as a large roller would, which is impracticable for interference, besides objectionable for size; but it is desirable for accuracy in spacing the lines to have the paper run about as it would on a drum, instead of drawing in a straight line between the paper-clip and the platen, for which the buggy-top or fan-stick contrivance, consisting of a series of wire bows 6, is employed, said bows being pivoted on the shaft 10, so as to close together against the upper end of the scratch-plate $38^\times$, and being connected to the clip-bar 4 and also connected together successively by short lengths of tapes 40, so as to spread out into a skeleton drum under the paper when the paper is drawn out by the clip, and, together with said arms, they fold up compactly within the boundaries of the base-plate when the machine is to be closed and covered. The base 2 of the carriage thus constructed rests on the slideway-rib 41 of the bed-plate and is pivoted at 42 to the long arms 43 of a double Watt's parallel motion, which are connected to the fulcrum 44 and 45 on the bed-frame by the links 46 and 47, respectively, for efficacy of operation and for the simplest contrivance of carriage mechanism in respect of cost of construction, wearing parts, friction, and parts to be lubricated.

I prefer to employ the double parallel mechanism here shown, but I intend to use only the single form when it may be preferred, that is, one arm 43 and one each of the links 46 and 47, which, with guide-flanges 90 on the base-plate 2 to act in conjunction with the slideway 41 of the bed-plate to prevent lateral play of the carriage, will serve about as well as the double contrivance.

The motion of the carriage to feed the paper along the type is caused by the spring 48, connected to one of the arms of the parallel motion and to the bar 49 of the bed-frame, as shown in Figs. 5 and 7. In the other way the carriage is shifted by hand to set it for the beginning of the lines. The feeding by the spring is regulated by the escapement apparatus gearing with the rack 50, attached to the base-plate 2 of the carriage and consisting of the pinion 51 and the ratchet-wheel $51^\times$, pivoted on the lever 52 at $52^a$ and provided with the retaining and tripping pawl 53 and space-pawl 54, said lever 52 being pivoted to the plate $i'$ at $i^6$ in suitable relation to the rack 50 for enabling the pinion 51 to be lifted out of the rack when the carriage is to be pulled back to the right hand for the beginning of the lines, and said lever is provided with a spring $52^\times$ to hold the pinion in the rack. The retaining-pawl 53 is pivoted at 55 to the lever 52 and has a spring 56 to bear it into the notches of the ratchet-wheel, and it also has a tail-guard $56^\times$, that keeps space-pawl 54 out of the ratchet-teeth when the retaining-pawl is in.

The space-pawl 54 is pivoted at 57 to a pawl-arm 58, that is pivoted at the axis of the ratchet-wheel and has a spring 59, that tends to swing the space-pawl 54 around the ratchet-wheel in the reverse of the movement of said ratchet when the toothed rack shifts to the left for spacing the letters and normally holds the space-pawl arm up against the transfer-lever 60, which is employed to regulate the spacing according as it is required to be varied for the different widths of the characters to be printed.

When the escapement is to be worked for spacing, the retaining-pawl 53 is tripped by the incline or wedge 61 on the sliding bar 62, working in the slot 63 of lever 52 and bearing down on the arm of the retaining-pawl at 64, which swings tail-guard $56^\times$ below the points of the ratchet-teeth and allows space-pawl 54 to engage the ratchet-wheel, which is then turned by the carriage-spring 48, through the medium of the rack and pinion, moving the space-pawl with it. From the normal position of the space-pawl the movement of the ratchet is limited by said space-pawl to the space of three teeth, which movement is sufficient for the widest or "m" space. This limitation of the ratchet-wheel is caused by the lower point of the arm of the space-pawl coming in contact with the lifting-plate 82 while the ratchet is being turned by the carriage-spring. The lifting-plate is principally employed for lifting the pinion 51 of the escapement out of the rack 50, but is also utilized for this retaining, as being the most convenient for the purpose, said plate being located on base-plate 2, under said pawl. When the space-pawl 54 is arrested by the plate 82, the retaining-pawl 53 is allowed by the reverse movement of the wedge 61 to drop into the ratchet-wheel $51^\times$ again, and the tail-guard $56^\times$ of said retaining-pawl throws out the space-pawl from contact with the ratchet-wheel, and said space-pawl then shifts back again by the action of spring 59 of the pawl-arm 58 to its normal position against transfer-lever 60, ready for the next operation.

For medium spaces the space-pawl is forced down the space of one tooth along the tail-guard $56^\times$ before it is allowed to engage the ratchet, and then only allows the ratchet to turn the space of two teeth, and for the shortest spaces said pawl is forced down two teeth prior to engaging the ratchet when the ratchet only shifts the space of one tooth. These different spaces are supposed to be sufficient for all practical purposes for the letters; but more or less may be provided for in the same manner.

For wider spaces between words and for blank spaces provision is made, as before stated, whereby the operation of the escapement may be repeated either by the key-plate or the space-key without causing the type to print. The sliding wedge-bar 62 for tripping the escapement is connected to a bell-crank 66, pivoted directly under the front edge of the key-plate, and said key-plate is mounted on pivots 67, with a spring 68 to hold it up normally to be depressed for releasing the retaining-pawl of the escapement and also for pressing the type on the paper. The rise of the key-plate by the spring 68 is limited by the toe $69^\times$ of the key-plate arm and the stop-lug $70^\times$ of the bed-plate.

For allowing the paper-carriage to be shifted back to the right for the beginning of the lines the lifting-plate 82 is fitted on the base-plate 2 to run under the arm $53^\times$ of the escapement-lever 52, and is provided with a handle $82^\times$, by which the plate may be readily tilted on its pivots 83, so as to raise the pinion of the escapement out of the teeth of the rack-bar 50 and at the same time enable the operator to shift the carriage with the same handle. When shifted back to the starting-point, the lifting-plate is shifted down again before releasing the handle, which allows spring $52^\times$ to throw the pinion into gear with the rack again.

The transfer-lever 60 for adjusting the space-pawl is pivoted to the fulcrum 69 and bears at the other end on the transfer-bar $x'$, which, together with the two other transfer-bars $y'$ and $z'$ for working the type-mount, is pivoted at both extremities on the fulcrum-studs $a^2$ of the opposite sides of the bed-plate, respectively. The bar $x'$ is to be worked for adjusting the space-pawl by such of the keys $s^2$ as represent or print the medium or shortest space letters. For the wide or "m" space letters the space-pawl is not required to be adjusted from its normal position by said lever 60, as before stated, and consequently the transfer-bar $x'$ is not shifted by such keys.

The space-pawl-transfer lever 60 and transfer-lever $p^2$ of the type-mount connection have their fulcrum-pivots 69 and 71 on the bracket-arm 72, and the transfer-lever $q^2$ of the type-mount connection has its fulcrum 73 on the bracket-arm 74, which is secured to the plate $i'$, together with one foot of the bracket 76, that supports the type-mount levers $e$ and $f$, all by the screws 77, making a simple and economical contrivance for the attachment of the brackets. The bracket 76 supports the fulcrum-pivots $b^2$ and $d^2$ of the type-mount levers $e$ and $f$, also the slot-guide 80 for the end of lever $p^2$, that works the type-mount lever $e$.

The plate $i'$, that contains the guide $h'$ for the type and supports the lever-brackets above described, and to which the carriage-escapement lever 52 is pivoted, is secured by angle-plates 81 to the end plates of the table $e^3$. In the construction of the carriage and the paper-cylinder the end supports 3, with their arms 7 and feet 84, are stamped out of thin sheet metal, are suitably punched for the various holes required, and also bent to shape the feet for bolting onto the base-plate 2. The paper-cylinder, suitably bent and being the height of the distance of the end supports apart, is placed between them and firmly secured by the clamp-rod 85, extended through the same centrally and through the end supports and screwed up with a nut. The end supports are stiffened by stamping the central depressions 87 in them, surrounding the bearings of the stay-rod. By this improved construction of the carriage the same is made lighter and cheaper, and at the same time having the requisite strength and durability.

The key-plate $i^2$ has a recess $z^7$ stamped in it for each key to receive the pads $w^2$, employed to prevent noise, said pads consisting of leather, rubber, or other suitable material, and the keys are fitted with metal disks $y^4$ to strike the pads, which disk and pads are made large for ample breadth of wearing-surface for durability.

The key-levers are stamped out of thin metal with a tongue $x^4$ to rivet on the disks and a tongue $w^4$ to rivet on the finger-knobs $s^4$, which consist of stamped metal cup-shaped devices which are riveted on through the bottom and are fitted with glass or other letter or character plates $v^4$ for designating the keys. The key-plate is also stamped with concave depressions $u^4$ to receive the key pivot-rods $j^2$, with a bearing-cap strip $v^5$ thrust upward at the side of each key-slot under which the key-rods are inserted and confined. The keys are connected with the key-plate by placing them in their respective slots and sliding the rods through them as they are inserted in the bearing-grooves of the key-plate. The keys have suitable bearing-hubs for wear and turn loosely on the rods.

The key-plate has arms $t^4$ riveted to it, which carry a rock-shaft $q^4$, by which it is mounted in the centers 67.

I do not herein claim a type-writer paper-carriage combined with a spring, a ratchet-wheel, and two pawls alternately in gear with the ratchet-teeth on said wheel, one of said pawls having a positive variable oscillating throw about the center of said wheel in a direction opposite to the rotation of said wheel and the other pawl acting as a detent.

Having thus described my invention, what I claim, and desire to secure by Letters Patent, is—

1. In a type-writer the combination of double and unlike ended type, mounted so as to be reversed at the will of the operator, and reversing mechanism substantially as described, with the platen and impression mechanism substantially as set forth.

2. The combination in a type-writer of double and unlike ended reversible type, a platen or impression-block, and means for actuating the type, substantially as described.

3. The combination of the double-ended sliding type, rotating supporting-plates for the type, turning and stop studs connecting with said supporting-plates, turn-hook, spring-pressed keeper, and mechanism for working the turn-hook substantially as described.

4. The combination of the supporting and reversing shaft and parallel perforated plates for supporting the type, said plates having end flanges and center bearing-caps for connecting with the supporting-shaft substantially as described.

5. The combination with the type supporting and reversing shaft of perforated type-supporting plates parallel with the shaft and having end flanges with center caps to embrace the supporting-shaft, and the collars and binding-screws securing said plates to the shaft substantially as described.

6. The combination of the perforated type-supporting plates, the supporting-shaft parallel with the plates and having said plates fitted thereto, and the frame-plate having the flanged side projections for the journal-bearings of the shaft substantially as described.

7. The combination of the type-mount frame-plate and type-mount shaft, said plate having the flanged side projections for supporting the journal-bearings of said shaft and being offset to the vertical plane of the axis of the journal-bearings for balancing the type-mount, and said flanged projections stayed by connection with the edges of the plate in the offset substantially as described.

8. The combination with the type-mount of the keeper pivoted in the journal-bearing flange of the type-mount frame-plate, its spring, and the bearing-supports for the supporting-rod for the spring of said keeper formed in a flanged and bent projection of said plate substantially as described.

9. The type-cylinders composed of a split tube and type secured in the bore thereof substantially as described.

10. The combination with a hollow sliding type-cylinder of a reacting-spring located in the hollow space and having an arm projecting out of the cylinder and against a bearing for reacting thrusts, substantially as described.

11. The combination with the hollow slitted and reversible type-cylinders and their supporting-plates of the reacting-springs located in the hollow space of the cylinders and having both ends projecting from the cylinders and bearing against the plates to retract the cylinders in both directions substantially as described.

12. The combination with the slitted type-cylinders of corrugated key-plates securing one or more rows of the cylinders by their ribs engaging the slits, said key-plates being confined between end bearings preventing longitudinal shift of the same substantially as described.

13. The combination with the type-mount, of actuating-levers which support it and effect universal motion of it in its plane, and a spring that balances the type-mount and levers substantially as described.

14. The combination with the type-mount of actuating-levers which support it and effect universal motion of it in its plane, a spring that balances the type-mount and levers, a stop-rest and a spring that returns the type-mount to the stop-rest substantially as described.

15. The combination with the type-mount and actuating-levers which effect universal motion of the same in its plane, of transfer-levers and transfer-bars respectively connected with said type-mount levers, and wedge-slides having wedges respectively actuating said transfer mechanism, said slides connected to the keys for operating said wedges, transfer mechanism and type-mount substantially as described.

16. The combination with the type-mount and actuating-levers which effect universal motion of the same in its plane and with the respective transfer mechanisms connected with said type-mount levers, of wedge-slides having adjustable wedges for working and regulating said respective transfer mechanisms and type-mount levers, substantially as described.

17. The combination of the type-mount, type-mount levers, balancing-spring, transfer-levers, transfer-bars and the wedge-slides connected with the keys, said slides having wedges for working the transfer-bars substantially as described.

18. The combination with the transfer-bars of the wedge-slides consisting of thin plates having the wedges pivoted to the side, with adjusting-screws resting on the edge, and said plates arranged edgewise between their supports and the transfer-bars substantially as described.

19. The combination of the slides, wedges, adjusting-screws, and spring-nuts substantially as described.

20. The combination in a type-writer of a type-mount in which the type are collectively mounted with the wedge-slides, wedges, transfer-bars, transfer-levers and type-mount levers for bringing the respective type to the printing-point, an escapement for the carriage shifting mechanism and variable space-pawl, transfer-lever, transfer-bar, and wedges connecting the space-pawl with the wedge-slides and keys substantially as herein set forth whereby each key is made to effect the type-mount and space-pawl adjustment in the first part of the stroke of the keys and to release the paper-carriage escapement in a later part of the stroke, substantially as described.

21. The combination in a type-writer of a type-mount in which the type are collectively mounted with the wedge-slides, wedges, transfer-bars, transfer-levers and type-mount levers for bringing the respective type to the printing-point, keys for operating the same, a key-plate having the keys pivoted on it for actuating the type-mount and being also pivoted for continuation of the key movement subsequently to actuating the type-mount, the paper-carriage escapement and the elbow-lever and wedge-bar for tripping said escapement by the key-plate movement substantially as described.

22. The combination in a type-writer of a type-mount in which the type are collectively mounted, with mechanism for bringing the respective type to the printing-point, keys for operating the same, a key-plate having the keys pivoted on it for actuating the type-mount and being also pivoted for continuation of the key movement subsequently to actuating the type-mount, the paper-carriage escapement the space-adjusting mechanism and the elbow-lever and wedge-bar for tripping said escapement by the key-plate movement, also the transfer-lever, transfer-bar and wedges, and wedge-slides connected with the keys for actuating the space-adjusting mechanism by the keys substantially as described.

23. The combination in a type-writer of a type-mount in which the type are collectively mounted with mechanism for bringing the respective type to the printing-point, keys for operating the same a key-plate having the keys pivoted on it and being also pivoted for continuation of the key movement subsequently to actuating the type-mount, the plunger for effecting the impressions and the means for actuating the plunger by the key-plate movement substantially as described.

24. The combination in a type-writer of a type-mount in which the type are collectively mounted, with wedge-slides, wedges, transfer-bars, transfer-levers, and type-mount levers for bringing the respective type to the printing-point, keys for operating the same, a key-plate having the keys pivoted on it and being also pivoted for continuation of the key movement subsequently to actuating the type-mount, the paper-carriage escapement, plunger for effecting the impressions, elbow-lever and wedge-bar for tripping said escapement by the key-plate movement, and also the toggle-arms connecting rod and lever for actuating the impression-plunger by said key-plate movement substantially as described.

25. The combination in a type-writer, of a type-mount in which the type are collectively mounted with mechanism for bringing the respective type to the printing-point, keys for operating the same, a key-plate having the keys pivoted on it and being also pivoted for continuation of the key movement subsequently to actuating the type-mount, the paper-carriage escapement, space-adjusting mechanism, the transfer-lever, transfer-bar wedges and wedge-slides for actuating the space mechanism by the keys, the elbow-lever and wedge-bar for tripping the escapement by the key-plate movement, impression-plunger and the toggle-arms, connecting rod and lever for actuating the impression-plunger by the key-plate movement, substantially as described.

26. The combination with the space-pawl of the carriage-escapement in a type-writer, of wedges or inclines, a transfer-bar and transfer-lever actuated by the keys, and the pivoted tail-guard which keeps the space-pawl out of the ratchet substantially as described.

27. The combination with the space-pawl of the carriage-escapement in a type-writer, of wedges or inclines, a transfer-bar and transfer-lever actuated by the keys; the pivoted tail-guard and the retaining-pawl substantially as described.

28. The combination with the type-mount and type-mount levers, also with the space-pawl of the paper-carriage escapement, and with the keys, of wedge-slides, transfer-bars and transfer-levers operating the type-mount, and also wedges operating the transfer-bar and transfer-lever to actuate the space-pawl by the keys, substantially as described.

29. The combination of the wedge-bar, and retaining-pawl of the paper-carriage escapement, with the pivoted key-plate connected with said bar, and the type-mount adjusting-keys pivoted on said key-plate substantially as described.

30. The combination with the space-pawl, wedge-bar, and retaining-pawl of the paper-carriage escapement, of the pivoted key-plate, type-mount adjusting-keys pivoted on said key-plate and the wedge-slides and transfer mechanism for actuating the space-pawl substantially as described.

31. The combination of the wedge-bar space-pawl and retaining-pawl of the paper-carriage escapement, pivoted key-plate, type-mount adjusting-keys pivoted on said key-plate, wedge-slides, and the respective systems of wedges and transfer mechanism operated by the wedge-slides and separately connected with the type-mount levers, and the space-pawl, substantially as described.

32. The combination with the ribbon-spools, of the impression-plunger, the two pivoted levers connected therewith and leading in opposite directions, and the pawls pivoted on said levers and adapted to operate the ribbon-spools reversely substantially as described.

33. The combination in a type-writer of ribbon-spools located at opposite sides of the printing-point, and the impression-plunger, pawl and pawl-levers for the respective spools connected with the said impression-plunger, reversing-pawls and the pawl-shifting slide substantially as described.

34. The combination of the type-mount arranged for bringing the type respectively to the printing-point, the paper-carriage arranged to shift the paper along the type, plunger arranged for actuating the type for making the impressions, and actuating the ribbon-spools for shifting the ink-tape along the printing-point, keys wedge-slides, wedges, transfer-bars, transfer-levers, and type-mount levers, also the elbow-lever and wedge-bar, and also the toggle-arms connecting rod and lever, connecting mechanism arranged for successively shifting the type-mount, releasing the paper-carriage escapement and operating the plunger by each stroke of the keys, all substantially in the arrangements herein described.

35. The combination of the type-mount arranged for bringing the type respectively to the printing-point the paper-carriage arranged for shifting the paper along the type and for varying the spaces of the same, the plunger arranged for actuating the type for making the impressions, the ribbon-spools for shifting the ink-ribbon along the printing-point, and actuating-keys, wedge-slides, wedges, transfer-bars, transfer-levers, and type-mount levers, also transfer-bar and transfer-lever, also the elbow-lever and wedge-bar, and also the toggle-arms, connecting rod and lever, connecting mechanism arranged for successively shifting the type-mount, adjusting the space mechanism, releasing the paper-carriage escapement, operating the plunger, and shifting the ribbon by each stroke of the keys, all substantially in the arrangement herein described.

36. The combination with the paper-carriage and its actuating-spring in a type-writer, of the escapement ratchet-wheel geared with the paper-carriage by a rack and pinion the retaining and space pawls constructed substantially as specified so as to permit the shift of the paper-carriage at the release of the escapement, and the wedge-bar and space-key for tripping the retaining-pawl substantially as described.

37. The combination with the paper-carriage and its actuating-spring in a type-writer, of an escapement ratchet-wheel geared with the paper-carriage by a rack and pinion retaining and space pawls arranged as described for the shift of the carriage at the release of the escapement, and the wedge-bar for tripping the retaining-pawl, which bar is arranged as described for operation either by the space-key or by the key-plate at the will of the operator substantially as described.

38. The combination with the paper-carriage and its actuating-spring in a type-writer, of an escapement ratchet-wheel geared with the paper-carriage by a rack and pinion retaining and space pawls arranged for the shift of the carriage at the release of the escapement, the wedge-bar for tripping the retaining-pawl, said wedge-bar arranged for operation either by the key-plate directly, or by the key-plate through a type-key, at the will of the operator substantially as described.

39. The combination of the escapement mechanism consisting of the pinion, ratchet-wheel, retaining-pawl, space-pawl, tail-guard of the stop-pawl, and the lever carrying the same, with the toothed rack of the carriage-escapement-lifting plate, and carriage-spring substantially as described.

40. The combination in a paper-carriage of a type-writer, of the paper-cylinder, spacing-arms, and paper-holding clips, said spacing-arms having means for shifting them substantially as described.

41. The combination with the spacing-arms and paper-clips of the extensible skeleton drum substantially as specified.

42. The extensible skeleton drum consisting of a series of bow frames, pivoted in the axis of the spacing-arms and connected together and to the spacing-arms with extensible tapes in combination with said spacing-arms substantially as described.

43. The combination with the spacing-arms and paper-holding clips, of the feeding-ratchet and intermediate wheel and pinion gearing said ratchet with the space-arm shaft substantially as described.

44. The combination with the paper-carriage in a type-writer of the paper-shifting arms, ratchet-wheel connected therewith, the feeding-pawl and pawl-lever having a uniform range of movement, and the adjustable pawl cut-off substantially as described.

45. The combination with the line-spacing arms and the spacing-ratchet of the paper-carriage, of the disconnecting-clutch and the friction device for holding the arms substantially as described.

46. The combination with the line-spacing arms and the spacing-ratchet of the paper-carriage, of the disconnecting-clutch consisting of the space-arm-turning knob splined to the arm-shaft, and fitted with a stop-stud and spring substantially as described.

47. The combination with the line-spacing arms, the friction device substantially as specified for the holding and the spacing ratchet of the paper-carriage, of the disconnecting-clutch consisting of the space-arm-turning knob splined to the space-arm shaft and fitted with a stop-stud and spring substantially as described.

48. The combination of the line-spacing arms and paper-clips adapted to shift the paper from and back to the printing-point, of the scratch-plate adapted for the support of the paper for scratching substantially as described.

49. The combination of the pivoted key-plate having the recessed striking-pads and the keys pivoted on said plate and having the striking-disks substantially as described.

50. The combination in a paper-carriage of the paper-cylinder having the slit in the side, the stamped or depressed end supports attached to the base-plate and receiving the ends of the cylinder in its depressions and the clamping center rod extended through the end supports and the cylinder substantially as described.

51. In a type-writing machine the combination with a paper-carriage and a bed-plate or base-support of two parallel arms 43, two links 46, and two links 47, each of said arms being connected at one end to the carriage, and at the other end to the free end of one of the links 47, and each of the said links 46, being connected at one end to the bed-plate and at the other end to the middle of one of the set of parallel arms substantially as described.

In witness whereof I have hereunto signed my name in the presence of two subscribing witnesses.

HORACE L. ARNOLD.

Witnesses:
W. J. MORGAN,
S. H. MORGAN.